United States Patent Office 2,946,448
Patented July 26, 1960

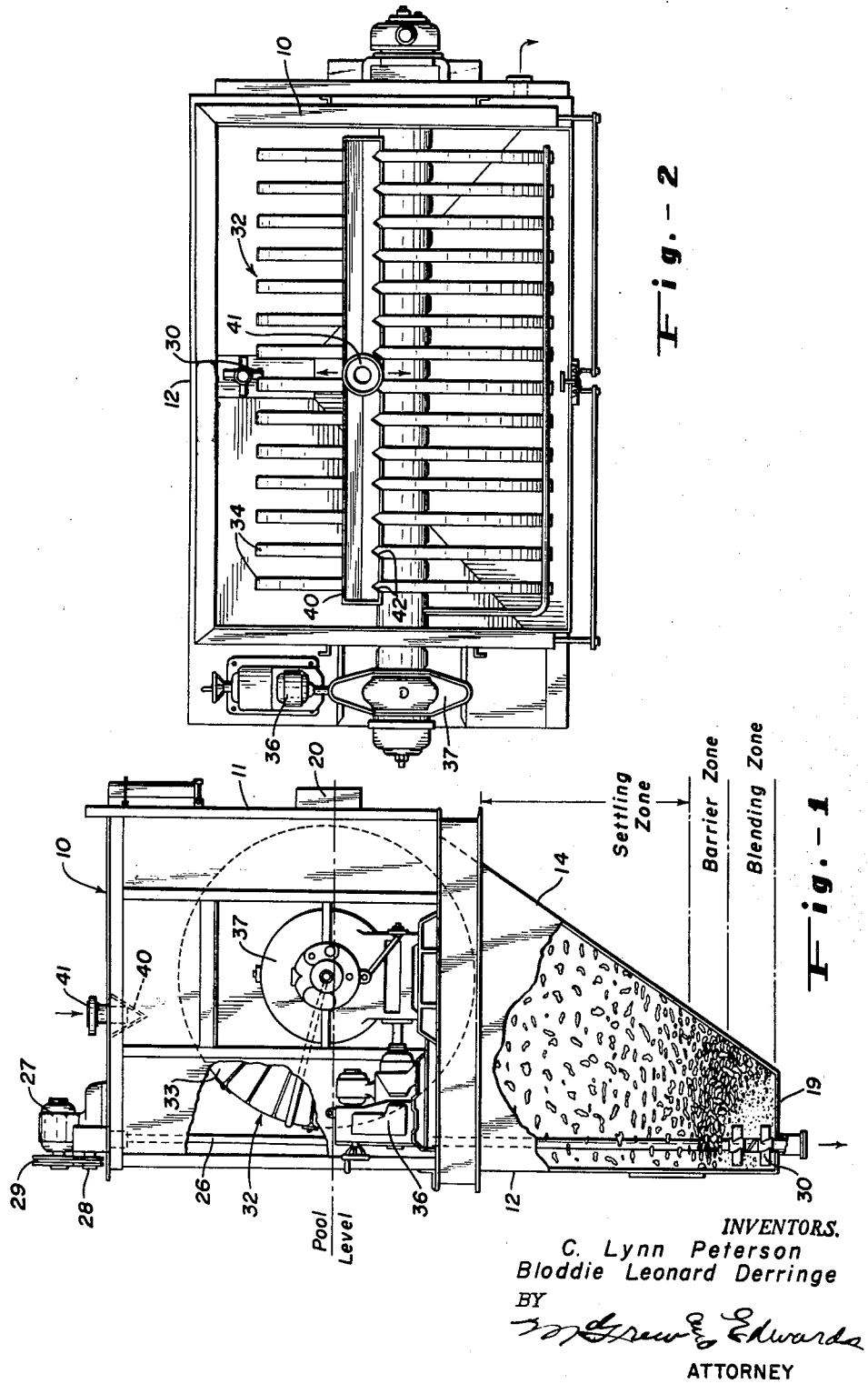

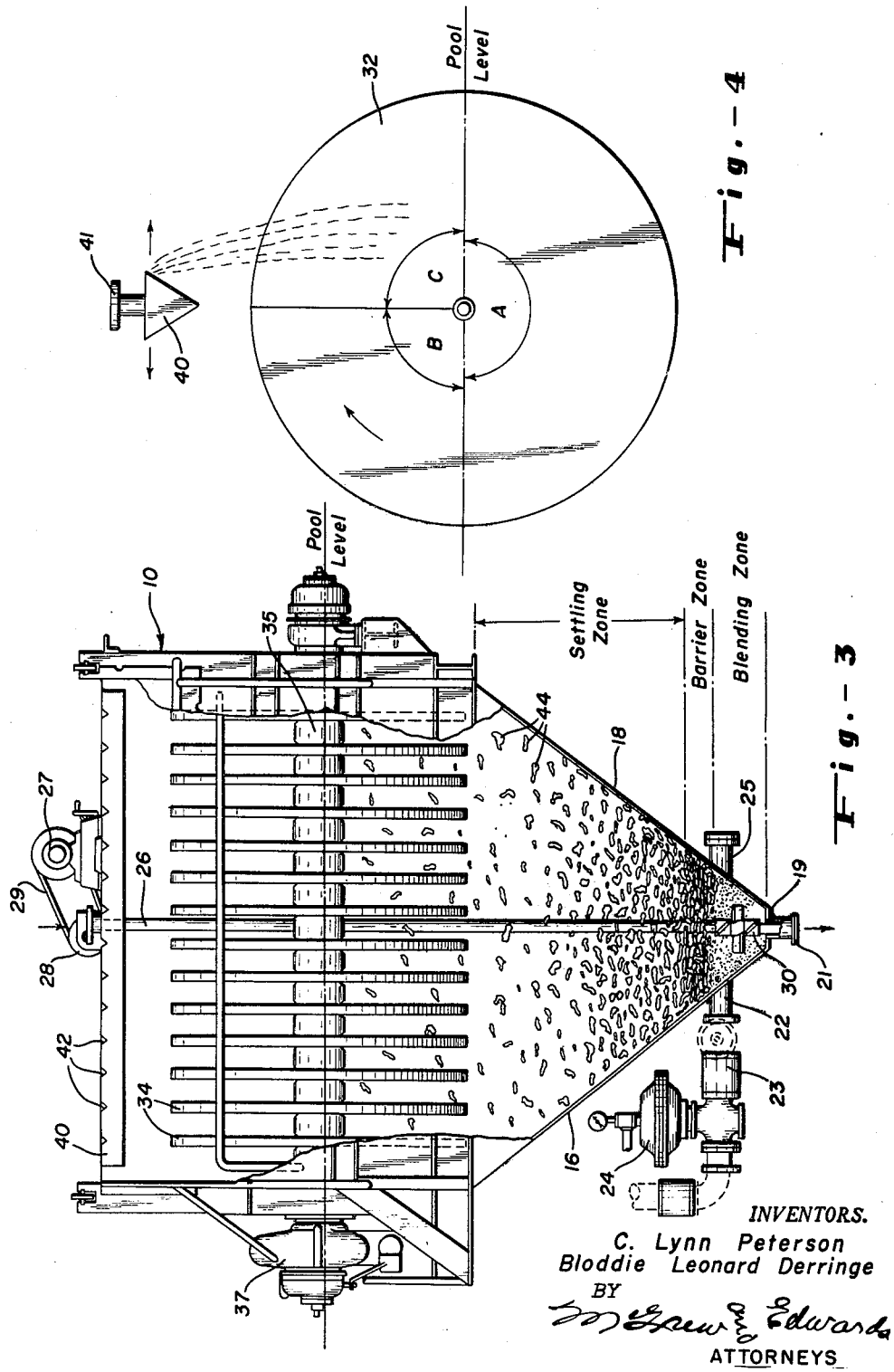

2,946,448

HIGH DENSITY THICKENER

C. Lynn Peterson, Salt Lake City, Utah, and Bloddie Leonard Derringe, Greensburg, Pa., assignors to Peterson Filters & Engineering Company, Salt Lake City, Utah, a corporation Filed Mar. 18, 1955, Ser. No. 495,286

3 Claims. (Cl. 210—331)

This invention relates to a method and apparatus for separating finely divided solids from liquids, and more particularly to thickening apparatus for eliminating a substantial portion of liquid from a mixture of such solids suspended in a liquid medium.

This application is an improvement of Peterson applications, Serial No. 172,607, filed July 7, 1950, now abandoned, entitled Continuous Filter, and Serial No. 368,315, filed July 16, 1953, now abandoned, entitled Continuous Filter and Method Thereof.

Frequently in mining operations, particularly in coal mining and processing industry, a mixture of finely divided solids suspended in a liquid, herein termed a slurry or prefilt, must be partially dewatered or thickened for further processing. Such dewatering processes have heretofore been accomplished by the use of sedimentary thickeners or submerged rotary filters which filter a portion of the liquid from the slurry and discharge the filter cake directly into the slurry. The discharged filter cake settles to the bottom of the containing vessel and is subsequently discharged with a substantial amount of water as a thickened magma. When the prefilt has a low solids content, or where the solids are of rather high specific gravity, such submerged filters have been successful, but they have not been successful in operating on a prefilt of high solids content, low specific gravity solids, or where the filter cake tends to be sticky or tacky and difficult to discharge from the filter medium.

The present invention provides a method of filtering and thickening a prefilt of relatively high solids content or a prefilt having a low specific gravity solid therein, and an apparatus for performing such a method. The apparatus includes a rotary leaf filter, in which the leaves are arranged to form a series of discs spaced along a shaft, which discs are maintained only about half submerged in a pool of prefilt. The pool of prefilt is arranged to provide a deep settling zone for the slabs of filter cake which are discharged from the filter medium. The apparatus, furthermore, includes novel feed means which aids in the discharge of the cake from the filter elements.

Included among the objects and advantages of the present invention is an improved method and apparatus therefor for filtering a substantial proportion of liquid from a prefilt whereby to provide a thickened underflow or magma. The apparatus includes novel feed means which aids in the removal of filter cake from the surface of the filter medium, and furthermore, provides means for densifying the filter cake prior to its discharge from the filter medium, so that such filer cakes readily settle in the prefilt. The apparatus provides means for efficiently filtering a high solids content prefilt, or a prefilt containing low specific gravity solids, and provides a sufficient detention time of the discharged slabs of filter cake in the prefilt pool so that they may readily settle and be blended into a dense thickened magma for discharge from the apparatus.

These and other objects and advantages will be readily apparent by referring to the following description and appended drawings, in which:

Fig. 1 is a partial vertical section of a side elevational view of a device according to the present invention;

Fig. 2 is a top plan view of a form of the device;

Fig. 3 is a partial vertical section of a front elevational view of a form of the invention; and Fig. 4 is a schematic elevation of the filter illustrating the operational procedure thereof.

In brief, the apparatus of the invention includes a tank of substantial vertical extent for holding a pool of slurry, and a rotary filter element submerged only about half way therein. The filter element is a leaf-type filter which has leaves or sectors arranged around the drum in the form of a series of axially aligned discs. The filter is arranged for rotation whereby to pick up a cake of solids, or perform its filtering operation, through an arc of rotation equal to about the submergence of the leaves, a short, cake-dewatering arc in which the cake is densified, and a cake discharge arc. The dewatering and discharge arcs are out of the pool of prefilt. Feed from a feed launder flows over the filter elements in the arc of discharge of the filter cake so as to aid in the discharge of the cake when pressure is applied internally of the leaves to blow the cake from the surface of the filter medium. The tank provides a sump which extends a substantial distance below the lowest point of submergence of the filter element, and discharged cake settles toward the bottom of the sump where it is blended and continuously discharged from the pool as a thickened magma. The deep sump of the tank provides sufficient detention time to permit the densified slabs to settle through the prefilt to the bottom of the tank and to be compressed so as to permit it to be discharged as a thick underflow.

In the device illustrated, a tank shown generally by numeral 10 includes an upper substantially rectangular tank portion 11 having upright side walls and a closed bottom. The bottom of the tank includes a back portion 12 which is substantially upright and a sloping front portion 14, and two sloping sides 16 and 18 which converge from the upright section to a small bottom portion of the tank. A small bottom portion 19 completes the bottom section of the tank. The bottom 19 is spaced a substantial distance from the rectangular upright portion 11 of the tank. A surge overflow 20 is provided in the rectangular upper section 11 for determining maximum level of a pool of pulp in the tank. An outlet 22 extends horizontally away from the bottom of the tank and provides discharge for the thickened underflow from the tank. A check valve 23 in the outlet line 22 prevents back flow into the tank, and a diaphragm pump 24 provides means for pumping the cake from the tank. A discharge 25, on the other side of the tank, shown blanked off, provides means for discharging the cake from that side where desirable. A bottom outlet 21 provides means for draining the tank for servicing and maintenance thereof. An elongated shaft 26 extends from the top of the tank to the bottom thereof, and is driven by means of a motor 27 and a reducer drive 28. The motor is interconnected with the drive by means of a belt drive 29. A series of small blades 30 are secured to the shaft on the lower end thereof near the outlet 22 and form a blender. The blades mix or blend the settled slabs of cake into a substantially homogeneous, thickened magma which may be withdrawn from the tank through the outlet 22.

The filter elements shown generally by numeral 32, comprise a series of individual filter leaves 33 arranged into a disc 34. The details of construction of leaves suitable for use in this device are described in the above-mentioned copending applications. A series of such discs 34 are spaced across a drive shaft 35. The shaft is driven by means of a motor-reducer drive unit 36. A rotary valve 37 controls the filtering and discharge operation of the unit.

A feed box or launder 40 is adjustably placed near the top edge of the tank above the rotary filter elements 32. The feed launder 40 is a V-shaped box having a central feed inlet 41 and a series of small V-shaped weir notches 42 spaced along one edge thereof. The V weirs 42 are spaced to coincide with the discs 34 of the filter element. Feed which is discharged over each of the weirs 42 falls on the adjacent disc 34 therebelow, as more fully explained hereafter.

The filtering cycle is illustrated in Figure 4, where there is shown schematically a filter element 32 submerged about half of its diameter in a pool of pulp. The pick-up or filtering portion of the cycle occurs during the submergence of the filter element, arc A of approximately 180°, and the filtering pressure, that is the reduced pressure, is continued during arc B where air is drawn through the cake and displaces water so there is a compacting and a dewatering of the cake. The discharge pressure of blow back occurs during arc C which extends approximately 90° from the uppermost extent of the discs to about the point where the elements enter the pool of pulp.

Feed from the feed box 40 is introduced in such a manner that it cascades over each of the filter elements during the flow back in the discharge arc. The feed falling over the elements tends to strip the cake from the elements aiding in the discharge of the cake from the elements. In this manner a substantially clean filter medium is introduced into the pool. The leaves are subjected to reduced pressure or the filtering pressure through the filtering arc A and the drying arc B which is approximately 270° of the rotation of the elements. The blow back for cake discharge is applied during less than about 90° of the arc of rotation.

In operation of the device, feed is introduced into the feed box 40 and subsequently into the tank 10. A constant level is maintained in the tank by introducing feed in an amount greater than the discharge of filtrate and cake and a surge overflow 20 maintains the level of a pool. The discs are maintained at about one-half submergence in the pool. The filter elements 32 are rotated in the filtering cycle, picking up cake during submergence, dewatering during arc B, and discharging during arc C. Cake which is discharged from the filter elements settles through the prefilt to the sump as indcated in Figure 3. The filter cake is discharged as densified slabs 44 which settle into the bottom of the sump. The slabs accumulate in a very dense layer, called the barrier zone, with very little liquid trapped therein. This zone is of substantially higher solids content than the prefilt which fills the remainder of the tank. The blender 30 is rotated slowly enough to maintain the barrier zone intact, and blend the slabs with any solid matter which settles directly from the feed box, for example, sand and heavy material which is not actually filtered but settles to the bottom, along with a small amount of the prefilt into a homogeneous mass. The homogeneous and thickened magma is then discharged through discharge outlet 22 by means of a diaphragm pump 24. The rate of discharge is controlled, however, so as to maintain the barrier zone intact. If the discharge is too fast, the barrier zone will be broken and prefilt flows readily through the hole or broken section of the barrier zone so that very little thickening will actually be accomplished.

In one application, a prefilt of finely divided, low specific gravity coal is suspended in water to form a prefilt containing about 25 to 30% solids. The high density of the prefilt will not permit settling of the low gravity solids or of a cake formed by conventional filters. The device of the invention, however, compacts the cake in the dewatering arc so that the discharged cake settles without undue detention time. The underflow or thickened magma being discharged through outlet 22 is on the order of 50 to 60% solids. During the blow back or cake discharge, the overhead feed greatly aids in the removal of the cake from the filter surfaces. The cake is dewatered by air displacement during arc B where it is, also, densified.

The depth of the sump or pool of prefilt below the filter surfaces determines in a large measure the detention time of the settling filter cake slabs, and the compression of the slabs. Unless the cake slabs settle and compress at the bottom of the tank, very little thickening will actually be accomplished. To provide for satisfactory settling, the sump below the lowest point of the element should be at least about equal to the diameter of the filter element. By maintaining the barrier zone intact, a thickened magma may be withdrawn from the tank without undue recycling and subsequent steps of separation of the solids from the liquid.

The dewatering arc produces a dense cake which settles rapidly and compresses in thick slurries, and even with low density solids, the dewatered cake settles and compresses without undue detention time of cake in the sump. The feed box may be moved horizontally to position the cascading feed into the most effective point to aid the removal of the discharging cake. The horizontal positioning determines the point at which the falling feed strikes the sectors or leaves. The feed box may, also, be vertically adjusted to increase or decrease the height of fall of the feed. The higher the feed box is placed, the more force is exerted on the cake.

While the invention has been described by reference to a specific device, there is no intent to limit the invention to the precise details herein set forth, except insofar as presented in the following claims.

We claim:

1. In a filter device including a tank for slurry having feed inlet means in its upper portion and a discharge outlet for cake removal in its lower portion with a plurality of disc filter members mounted for rotation about a common horizontal axis above the discharge outlet and adapted to be partially submerged in tank-contained slurry and having means for subjecting each disc to variable differential pressures during each arc of revolution for inducing a flow from the slurry into the disc during the arc of submergence and an opposite flow during at least a portion of the remaining arc of the revolution, characterized by the fact that the feed inlet means includes a feed box extending laterally of the discs and includes points of cascading discharge immediately over at least a portion of the surface of each said disc exposed before its immersion in the slurry.

2. A device according to claim 1 in which said feed box is adjustably positioned above said discs.

3. A device according to claim 1 in which said feed box is V-shaped and has a V-shaped notch in one side thereof positioned directly above each disc providing said cascading discharge.

References Cited in the file of this patent

UNITED STATES PATENTS

| 1,253,162 | Faber | Jan. 8, 1918 |
| 2,406,065 | Dickinson et al. | Aug. 20, 1946 |

FOREIGN PATENTS

| 333,577 | Germany | Mar. 2, 1921 |